(12) United States Patent
Rutschman

(10) Patent No.: US 8,325,935 B2
(45) Date of Patent: *Dec. 4, 2012

(54) SPEAKER HAVING A WIRELESS LINK TO COMMUNICATE WITH ANOTHER SPEAKER

(75) Inventor: Phillip Rutschman, Seattle, WA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/410,230

(22) Filed: Mar. 1, 2012

(65) Prior Publication Data

US 2012/0155670 A1  Jun. 21, 2012

Related U.S. Application Data

(63) Continuation of application No. 12/048,038, filed on Mar. 13, 2008, now Pat. No. 8,155,335.

(60) Provisional application No. 60/918,252, filed on Mar. 14, 2007.

(51) Int. Cl.
*H04B 5/00* (2006.01)
*H04R 1/10* (2006.01)

(52) U.S. Cl. ............. 381/79; 381/11; 381/74; 381/311; 381/384; 348/554; 348/558; 348/E5.114; 455/41.2; 455/570; 455/575.2

(58) Field of Classification Search .................. 381/11, 381/74, 79, 311, 384; 348/554, 558, E5.114; 455/41.2, 570, 575.2
See application file for complete search history.

(56) References Cited

U.S. PATENT DOCUMENTS

| 4,119,005 A | 10/1978 | Kondo et al. |
| 4,259,888 A | 4/1981 | Gross |
| 5,206,446 A | 4/1993 | Matsumoto et al. |
| 5,414,210 A | 5/1995 | Sato |
| 6,058,066 A | 5/2000 | Norris et al. |
| 7,627,289 B2 * | 12/2009 | Huddart ............ 455/41.2 |

(Continued)

FOREIGN PATENT DOCUMENTS

EP    1670283 A1    6/2006

(Continued)

OTHER PUBLICATIONS

International Search Report—PCT/US08/057153, International Searching Authority—European Patent Office, Jun. 27, 2008.

(Continued)

*Primary Examiner* — Dao H Nguyen
(74) *Attorney, Agent, or Firm* — Espartaco Diaz Hidalgo

(57) ABSTRACT

A wireless system including a first speaker and a second speaker, where the first and second speakers communicate with each other over a wireless link. In some configurations, the first speaker includes both a primary wireless interface for receiving audio from an audio source and a secondary wireless interface transmitting a portion of the audio to the second speaker. The speaker can incorporate Near Field Communication (NFC) technology to provide the wireless link between each other. The wireless system can be configured to synchronize audio output at the speakers, and can also include a second-speaker detection mechanism that permits the first speaker to be used in either a stand-alone mode, with audio output at only the first speaker, or full-headset mode, with audio output at both speakers when the second speaker is detected within wireless range of the first speaker.

39 Claims, 7 Drawing Sheets

U.S. PATENT DOCUMENTS

| | | |
|---|---|---|
| 2006/0251277 A1* | 11/2006 | Cho .............................. 381/311 |
| 2007/0008984 A1 | 1/2007 | Philips et al. |
| 2007/0037615 A1 | 2/2007 | Glezerman |
| 2007/0147630 A1* | 6/2007 | Chiloyan ........................ 381/74 |
| 2007/0149261 A1* | 6/2007 | Huddart ..................... 455/575.2 |
| 2008/0076489 A1 | 3/2008 | Rosener et al. |
| 2008/0226090 A1 | 9/2008 | Seto |
| 2008/0226094 A1* | 9/2008 | Rutschman .................... 381/79 |
| 2008/0318518 A1 | 12/2008 | Coutinho et al. |

FOREIGN PATENT DOCUMENTS

| | | |
|---|---|---|
| EP | 1715718 A2 | 10/2006 |
| JP | 2003259333 A | 9/2003 |
| JP | 2004120313 A | 4/2004 |
| JP | 2005277792 A | 10/2005 |
| JP | 2005286426 A | 10/2005 |
| KR | 20060051505 A | 5/2006 |
| KR | 20060110064 | 10/2006 |
| KR | 20060125678 A | 12/2006 |
| WO | WO2005013639 | 2/2005 |
| WO | WO2006051505 | 5/2006 |
| WO | WO2006053704 | 5/2006 |

OTHER PUBLICATIONS

Written Opinion—PCT/US08/057153, International Searching Authority—European Patent Office Jun. 27, 2008.

* cited by examiner

SPEAKER HAVING A WIRELESS LINK TO COMMUNICATE WITH ANOTHER SPEAKER

CLAIM OF PRIORITY UNDER 35 U.S.C. §119

The present application for patent is a Continuation and claims priority to patent application Ser. No. 12/048,038 entitled "Headset Having Wirelessly Linked Earpieces" filed Mar. 13, 2008 and claims priority to Provisional Application No, 60/918,252, entitled "Near-Field Communications Headset" filed Mar. 14, 2007, and assigned to the assignee hereby expressly-incorporated by reference herein.

BACKGROUND

1. Field

This disclosure generally relates to audio communications, and more particularly, to audio headsets.

2. Background

Wired and wireless headsets are known. Conventional wired headsets include a wire running between an audio source and either one or two earpieces that are intended to fit on or within a user's ears. In many cases, a wireless headset is simply a replacement for a wired headset. Generally, wireless headsets substitute a wireless link for the wire running between the headset and audio source. Wireless headsets are used to provide a greater degree of user freedom, as the user is no longer tethered to the audio source by a wire. It is known for both wired and wireless headsets to be used with audio sources such as communication devices, e.g., cordless telephones, mobile radios, personal digital assistants (PDAs), cellular subscriber units and the like, as well as other devices, such as MP3 players, stereo systems, radios, video games, personal computers, laptop computers and the like.

Known wireless headsets communicate with audio sources using radio frequency (RF) or infrared wireless technology. Such wireless headset communications have been extended to personal wireless networks, such as the one defined by the Bluetooth Specification available at www.bluetooth.com. The Bluetooth Specification provides specific guidelines for providing wireless headset functionality. In particular, the Bluetooth Specification provides a Headset Profile that defines protocols and procedures for connecting a wireless headset to a device private network. Once configured, the headset can function as a device's audio input and/or output. Thus, a particularly popular use of Bluetooth networks is to provide wireless headset connectivity for cellular telephones, MP3 players and PDAs. In addition, the Bluetooth Specification also provides the Advanced Audio Distribution Profile (A2DP) that defines protocols and procedures for wirelessly distributing high-quality stereo or mono audio over a Bluetooth network.

Wireless and wired headsets are available in both single earpiece and dual earpiece configurations. In dual-earpieces headsets, the earpieces are wired together and are often integrated into a headband that secures an earpiece over or in each ear.

Dual-earpiece headsets are advantageous because they allow playback of stereo audio and also because in some circumstances they allow users to fully immerse themselves in the audio output, while masking out noise from the immediate environment. However, known dual-earpiece headsets require additional wiring between earpieces and often include headbands, frequently making the headsets larger than some of contemporary audio source devices that they are intended to support, e.g., MP3 players, PDAs, and cellular phones. In addition, although dual-earpiece headsets are highly desirable in some situations, they are not desirable in others. For example, in some jurisdictions, it is not permissible to operate motor vehicles on public roadways while wearing dual-earpiece headsets.

Thus, there is a need for an improved headset that allows a user to conveniently select either a single earpiece or dual earpiece configuration. There is also a need for an improved headset that provides a dual-earpiece configuration that eliminates the need for headbands and wiring between earpieces, and is therefore better scaled to the relatively small size of many contemporary audio devices.

SUMMARY

Disclosed herein is a new and improved wireless headset that introduces significantly greater user freedom. The headset described herein can be entirely wireless, with no wires running between the earpieces or the audio source. A dual-earpiece configuration of the headset does not require a headband or wiring between the earpieces.

According to one aspect of the wireless headset, the wireless headset includes a first earpiece and a second earpiece, where the first and second earpieces communicate with each other over a wireless link.

According to another aspect of the wireless headset, the first earpiece may include both a primary wireless interface for receiving audio from an audio source and a secondary wireless interface for transmitting at least a portion of the audio to the second earpiece.

According to a further aspect of the wireless headset, a method of outputting audio at a headset includes receiving audio at a first earpiece, transmitting the audio from the first earpiece to a second earpiece over a wireless link, and outputting the audio at the first and second earpieces.

According to an additional aspect of the wireless headset, a system for outputting audio at a headset includes means for receiving audio at a first earpiece, means for transmitting the audio from the first earpiece to a second earpiece over a wireless link, and means for outputting the audio at the first and second earpieces.

According to an another aspect of the wireless headset, a computer-readable medium embodying a set of instructions, wherein the set of instructions when executed by one or more processors includes a code segment for receiving audio at a first earpiece, a code segment for transmitting the audio from the first earpiece to a second earpiece over a wireless link, and a code segment for outputting the audio at the first earpiece.

Other aspects, features, and advantages of the wireless headset will be or will become apparent to one with skill in the art upon examination of the following figures and detailed description. It is intended that all such additional features, aspects, processes and advantages be included within this description and be protected by the accompanying claims.

BRIEF DESCRIPTION OF THE DRAWINGS

It is to be understood that the drawings are solely for purpose of illustration. Furthermore, the components in the figures are not necessarily to scale, emphasis instead being placed upon illustrating the principles of the wireless headset and its various aspects. In the figures, like reference numerals designate corresponding parts throughout the different views.

DETAILED DESCRIPTION

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

The word "exemplary" is used throughout this disclosure to mean "serving as an example, instance, or illustration." Any embodiment or feature described herein as "exemplary" is not necessarily to be construed as preferred or advantageous over other embodiments or features.

Figure 1:
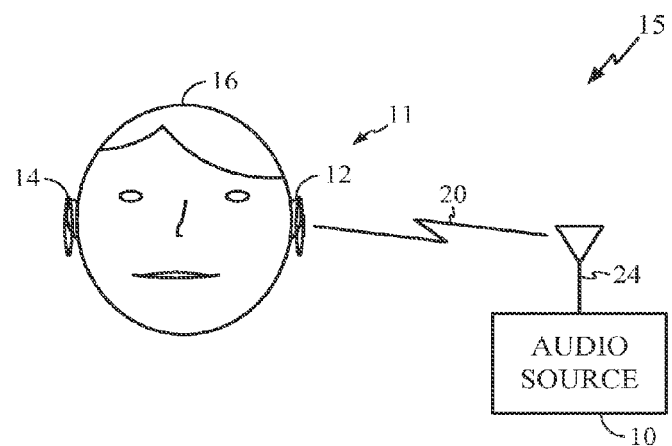
FIG. 1 is a diagram illustrating a user wearing an exemplary wireless headset with wirelessly linked earpieces.

Turning now to the drawings, and in particular to FIG. 1, there is illustrated a user 16 wearing an exemplary wireless headset 11 with wirelessly linked earpieces 12, 14. The wireless headset 11 communicates with an audio source 10 by way of a primary wireless link 20. The wireless headset 11 and audio source 10 form a wireless headset system 15.

The wireless headset 11 is worn as two separate pieces: a primary earpiece 12 and a secondary earpiece 14. The primary earpiece 12 communicates with the audio source 10 via an RF or infrared primary wireless link 20, and may be worn either alone or separately from the secondary earpiece 14. The secondary earpiece 14 receives audio and other information via a secondary wireless link with the primary earpiece 12. An optional microphone on the first earpiece 12 allows voice communication back to the audio source 10.

The audio source 10 may be any device capable of transmitting audio signals to the headset 11 such that the audio represented by the audio signals can be output to a user from the headset 11. The audio source may be a communication device, e.g., cordless telephone, mobile radio, personal digital assistant (PDA), cellular subscriber unit or the like, as well as another type of device, such as an MP3 player, stereo system, radio, video game, personal computer, laptop computer or the like.

The audio signals transmitted between the audio source 10 and the headset 11 over the primary wireless link 20 can represent digitized audio sampled at the industry standard rate of 44.1 KHz.

The headset 11 and earpieces 12, 14 can having any suitable physical shape and size adapted to securely fit the earpieces 12, 14 over or into a user's ears. For example, the earpieces 12, 14 can be conventional hook-shaped earpieces for attaching behind a user's earlobe and over or into the user's ear canal. The headset 11 can also include a headband (not shown) connecting the earpieces 12, 14.

Figure 2:
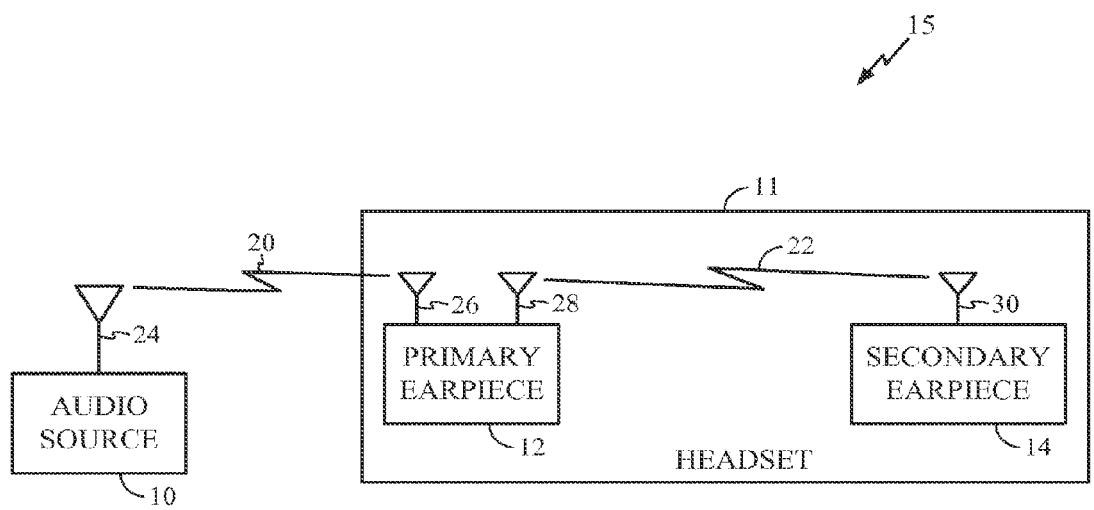
FIG. 2 is a conceptual block diagram illustrating components of the wireless headset system of FIG. 1.

FIG. 2 is a conceptual block diagram illustrating components of the wireless headset system 15 of FIG. 1. The primary earpiece 12 communicates with the audio source 10 via the primary wireless link 20 and with the secondary earpiece 14 by way of a secondary wireless link 22. The primary earpiece 12 may include a first antenna 26 for the primary wireless link 20 and a second antenna 28 for the secondary wireless link. The secondary earpiece 14 includes an antenna 30 for communicating over the secondary wireless link 22.

Although the primary earpiece 12 is shown as having separate antennas 26, 28 for the primary and secondary links 20, 22, respectively, one of ordinary skill in the art will understand that in some circumstances the primary earpiece 12 could use a single antenna for both the primary and secondary wireless links 20, 22.

The primary wireless link 20 may be implemented using any suitable wireless communications technology, including short-range wireless networks such as Bluetooth, Wi-Fi, Ultra Wide Band (UWB), or Wireless USB links. Preferably, the primary wireless link 20 is a Bluetooth wireless link for transporting audio, implemented in accordance with the Bluetooth Specification.

The secondary wireless link 22 may use any suitable wireless communications technology, and is preferably implemented using Near Field Communication (NFC) wireless devices operating in accordance with the NFC standard specifications, including ECMA-340, ISO/IEC 18092.

In operation, the primary earpiece 12 may receive a stereo or monaural audio signal via the primary wireless link 20. The primary earpiece 12 decodes the audio signal and renders the audio signal to its own audio transducer for output to the user. A copy of the audio signal or a portion thereof, possibly transcoded to reduce the bitrate, is also sent to the secondary earpiece 14 via the secondary wireless link 22. If the audio signal received by the primary earpiece 12 is in stereo, the primary earpiece 12 may render one stereo channel via its audio transducer, and send the other stereo channel as encoded audio via the secondary wireless link 22. If the secondary earpiece 14 is not present, the primary earpiece 14 may instead downmix incoming stereo to monaural audio prior to rendering the audio to its own audio transducer.

Figure 3:
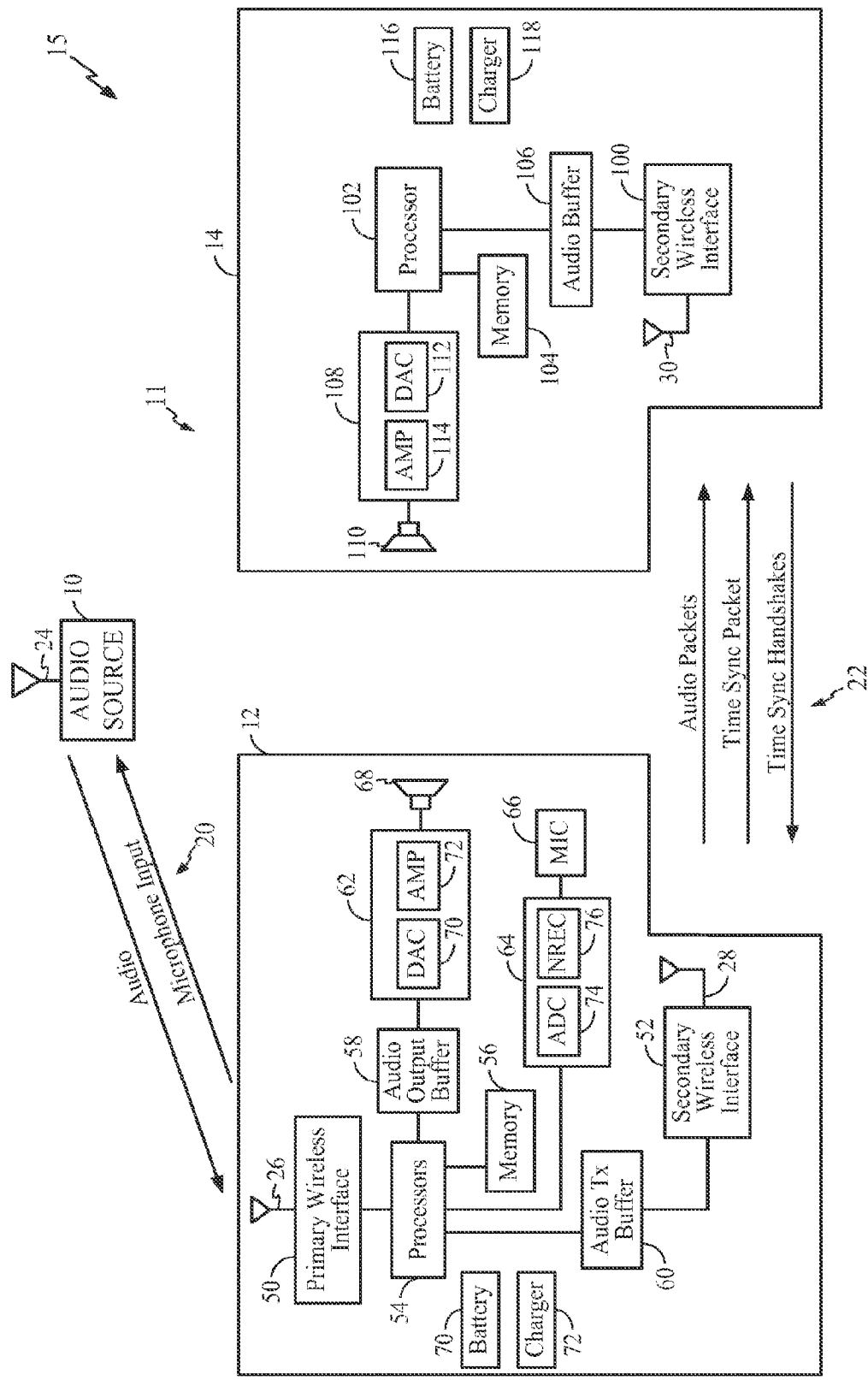
FIG. 3 is a detailed block diagram illustrating specific components of the wireless headset system of FIG. 1.

FIG. 3 is a detailed conceptual block diagram illustrating specific components of the wireless headset system 15. The primary earpiece 12 includes the antennas 26, 28, a primary wireless interface 50, a secondary wireless interface 52, a processor 54, a memory 56, an audio output buffer 58, an audio transmit (Tx) buffer 60, audio output circuitry 62, microphone input circuitry 64, a speaker 68, and a microphone 66. The primary earpiece 12 also includes a battery 70 and a battery charger circuit 72.

The primary wireless interface 50 provides two-way wireless communications with the audio source 10. Preferably, the primary wireless interface 50 includes a commercially-available Bluetooth module that provides at least a Bluetooth core system consisting of a Bluetooth RF transceiver, baseband processor, protocol stack, as well as hardware and software interfaces for connecting the module to the processor 54.

The processor 54 controls the overall operation of the primary earpiece 12 and certain components contained therein. The processor 51 can be any suitable processing device for executing programming instructions stored in the memory 56 to cause the primary earpiece 12 to perform its functions and processes as described herein. For example, the processor 54 can be a microprocessor, such as an ARM7, digital signal processor (DSP), one or more application specific integrated circuits (ASICs), field programmable gate arrays (FPGAs), complex programmable logic devices (CPLDs), discrete logic, software, hardware, firmware or any suitable combination thereof.

The memory 56 is any suitable memory device for storing programming instructions and data executed and used by the processor 54.

The audio output buffer 58 is any suitable memory device for temporarily storing digitized audio before it is transferred to the audio output circuitry 62 for rendering at the primary earpiece 12. The audio output buffer 58 is controlled by the processor 54 and buffers time-stamped audio packets awaiting output at the primary earpiece 12. Although shown as a separate component of the primary earpiece 12, the audio output buffer 58 may be included in the memory 56.

The audio output circuitry 62 includes a digital-to-analog converter (DAC) 70 and an audio amplifier 72. The DAC 70 converts digitized audio into an analog audio signal. The analog audio signal is then amplified by the audio amplifier 72 to drive the speaker 68. The audio output circuitry 62 is preferably implemented using commercially-available, off-the-shelf components.

The speaker 68 is any suitable audio transducer for converting the electronic signals output from the amplifier 72 into sound.

The microphone (MIC) 66 is any suitable microphone device for converting sound into electronic signals. The microphone 66 and speaker 68 may be combined into a single device in some configurations of the primary earpiece 12.

The microphone input circuitry 64 processing electronic signals received from the microphone 66. The microphone input circuitry 61 includes an analog-to-digital converter (ADC) 74 and a noise reduction and echo cancellation circuit (NREC) 76. The ADC 74 converts analog signals from the microphone into digital signal that are then processed by the NREC 76. The NREC 76 is employed to reduce undesirable audio artifacts for communications and voice control applications. The microphone input circuitry 64, the ADC 74 and NREC 76 may be implemented using commercially-available hardware, software, firmware, or any suitable combination thereof.

The microphone 66 may send audio data over the primary wireless link 20 to the audio source 10. The device receiving the microphone signal need not in general be the same audio source device as is sending the audio to the primary earpiece 12.

The audio Tx buffer 60 is any suitable memory device for temporarily storing digitized audio before it is transmitted over the secondary wireless interface 52 for rendering at the secondary earpiece 14. The audio Tx buffer 60 is controlled by the processor 54 and buffers time-stamped audio packets awaiting transmission to the secondary earpiece 14. Although shown as a separate component of the primary earpiece 12, the audio Tx buffer 60 may be included in the memory 56.

The secondary wireless interface 52 provides two-way wireless communications with the secondary earpiece 14. Preferably, the secondary wireless interface 52 includes a commercially-available NFC module that provides at least an NFC RF transceiver, baseband processor, protocol stack, as well as hardware and software interfaces for connecting the NFC module to the processor 54.

The battery 70 can be a replaceable, rechargeable battery for powering the primary earpiece 12. The battery charger circuit 72 may be a commercially-available battery charger circuit having an external jack that permits the battery 70 to be recharged using an AC wall adapter. The battery charger circuit 72 may be controlled by the processor 54.

The secondary earpiece 14 includes the antenna 30, a secondary wireless interface 100, a processor 102, a memory 104, an audio buffer 106, audio output circuitry 108, and a speaker 110. The secondary earpiece 14 also includes a battery 116 and a battery charger circuit 118.

The processor 102 controls the overall operation of the secondary earpiece 14 and certain components contained therein. The processor 102 can be any suitable processing device for executing programming instructions stored in the memory 104 to cause the secondary earpiece 14 to perform its functions and processes as described herein. For example, the processor 102 can be a microprocessor, such as an ARM7, digital signal processor (DSP), one or more application specific integrated circuits (ASICs), field programmable gate arrays (FPGAs), complex programmable logic devices (CPLDs), discrete logic, software, hardware, firmware or any suitable combination thereof.

The memory 104 is any suitable memory device for storing programming instructions and data executed and used by the processor 102.

The secondary wireless interface 100 provides two-way wireless communications with the primary earpiece 12. Preferably, the secondary wireless interface 100 includes a commercially-available NFC module that provides at least an NFC RF transceiver, baseband processor, protocol stack, as well as hardware and software interfaces for connecting the NFC module to the processor 102.

The audio buffer 106 is any suitable memory device for temporarily storing digitized audio before it is transferred to the audio output circuitry 108 for rendering at the secondary earpiece 14. The audio buffer 106 is controlled by the processor 102 and buffers time-stamped audio packets received at the secondary wireless interface 100 and awaiting output at the secondary earpiece 14. Although shown as a separate component of the secondary earpiece 14, the audio buffer 106 may be included in the memory 104.

The audio output circuitry 108 includes a digital-to-analog converter (DAC) 112 and an audio amplifier 114. The DAC 112 converts digitized audio into an analog audio signal. The analog audio signal is then amplified by the audio amplifier 114 to drive the speaker 110. The audio output circuitry 108 is preferably implemented using commercially-available, off-the-shelf components.

The speaker 110 is any suitable audio transducer for converting the electronic signals output from the amplifier 114 into sound.

The battery 116 can be a replaceable, rechargeable battery for powering the secondary earpiece 14. The battery charger circuit 118 may be a commercially-available battery charger circuit having an external jack that permits the battery 116 to be recharged using an AC wall adapter. The battery charger circuit 118 may be controlled by the processor 102.

Figure 4:
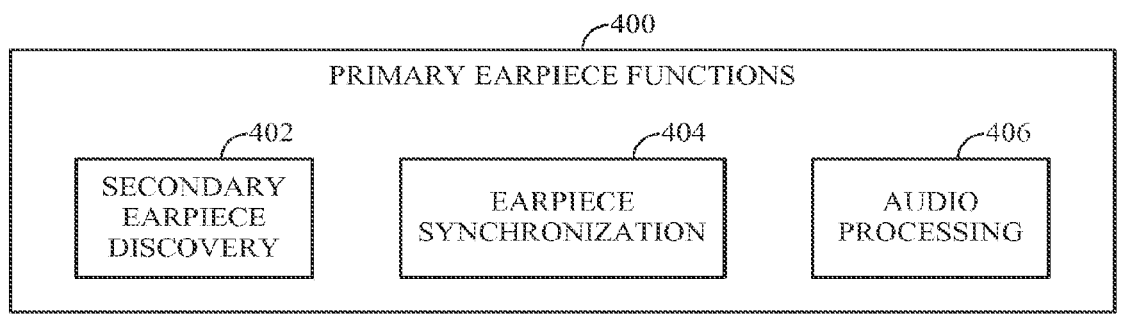
FIG. 4 is a conceptual block diagram illustrating certain functional aspects of a primary earpiece included in the wireless headset.

FIG. 4 is a conceptual block diagram illustrating certain functional aspects of a primary earpiece 12. The primary earpiece functions 400 generally include, but are not limited to, a secondary earpiece discovery function 402, an earpiece synchronization function 404, and an audio processing function 406.

The secondary earpiece discovery function 402 involves detecting the presence of the secondary wireless earpiece 14 when it is within range of the first earpiece 12 through the secondary wireless link 22. Upon detecting the second earpiece 14, the first earpiece proceeds to initiate and establish the secondary wireless link 22 with the secondary earpiece 14 so that audio can be output at the secondary earpiece 14. The detection and link initiation protocols and procedures are described by the NFC standard specification.

Each earpiece 12, 14 can store a unique identification number in its respective memory 56, 104 so that headset earpieces can be paired together to only recognize and communicate with each other.

The primary earpiece 12 can be adaptively configured to operate in a single-earpiece mode (stand-alone mode) when the secondary earpiece 14 is not within range of the primary wireless link 22 and in a dual-earpiece mode (full-headset mode) when the secondary earpiece 14 is within range. In single-earpiece mode, the primary earpiece 12 does not process audio for transmission to the secondary earpiece 14 and down-mixes any stereo input for output only at the primary earpiece 12. This reduces that power consumption of the primary earpiece 12.

In dual-earpiece mode, the primary earpiece processes and transmits audio and time synchronization data to the secondary earpiece 14. The primary earpiece 12 can switch from the single-earpiece mode to the dual-earpiece mode upon detecting the presence of the secondary earpiece 14 with wireless range, and can also switch from the dual-earpiece mode to the single-earpiece mode upon determining that the secondary earpiece 14 has moved out of wireless range.

Software or firmware stored in the memory 56 and executed by the processor 54 can implement the earpiece mode functionality of the primary earpiece 12. The software/firmware can configure the processor 54 to actively monitor the secondary wireless interface 52 to detect the presence or absence of the secondary earpiece 14 on the secondary link 22, and to switch between the single-earpiece and dual-earpiece modes are described immediately above.

Figure 8:
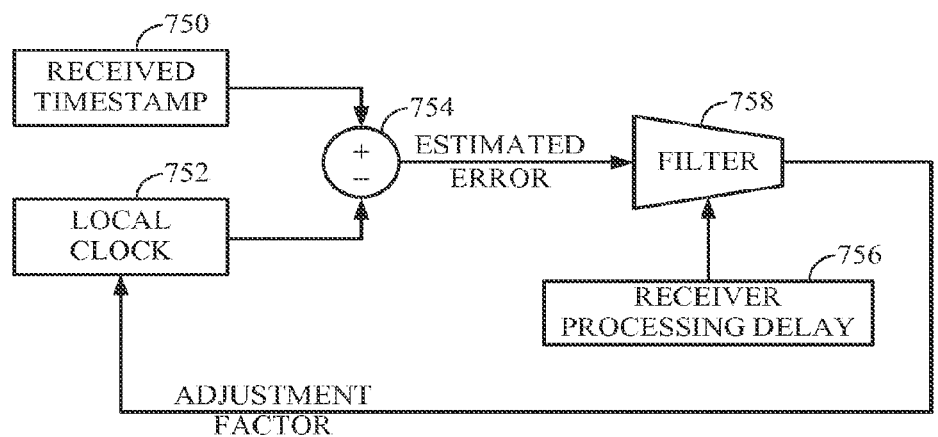
FIG. 8 conceptually illustrates a process of adjusting the local audio output clock within the secondary earpiece.

The earpiece synchronization function 402 involves synchronizing local clocks in the primary and secondary earpieces 12, 14 so as to synchronize the audio output at both earpieces 12, 14. This ensures that the separate rendering of the audio at the different earpieces 12, 14 retains inter-channel synchronization. Both earpieces 12, 14 maintain separate audio output clocks. These clocks are used to determine when to output chucks of audio from the earpieces 12, 14 at the speakers 68, 110. The audio output clocks have approximately the same frequency and each has an absolute current time value. The earpiece synchronization function 402 periodically adjusts the current time value of the secondary earpiece audio output clock so that it is at least approximately equal to the current time value of the primary earpiece audio output clock. The earpiece synchronization function 402 can also control the frequency of the local audio output clocks, FIGS. 7 and 8 describe methods for synchronizing the earpiece audio output clocks.

Figure 5:
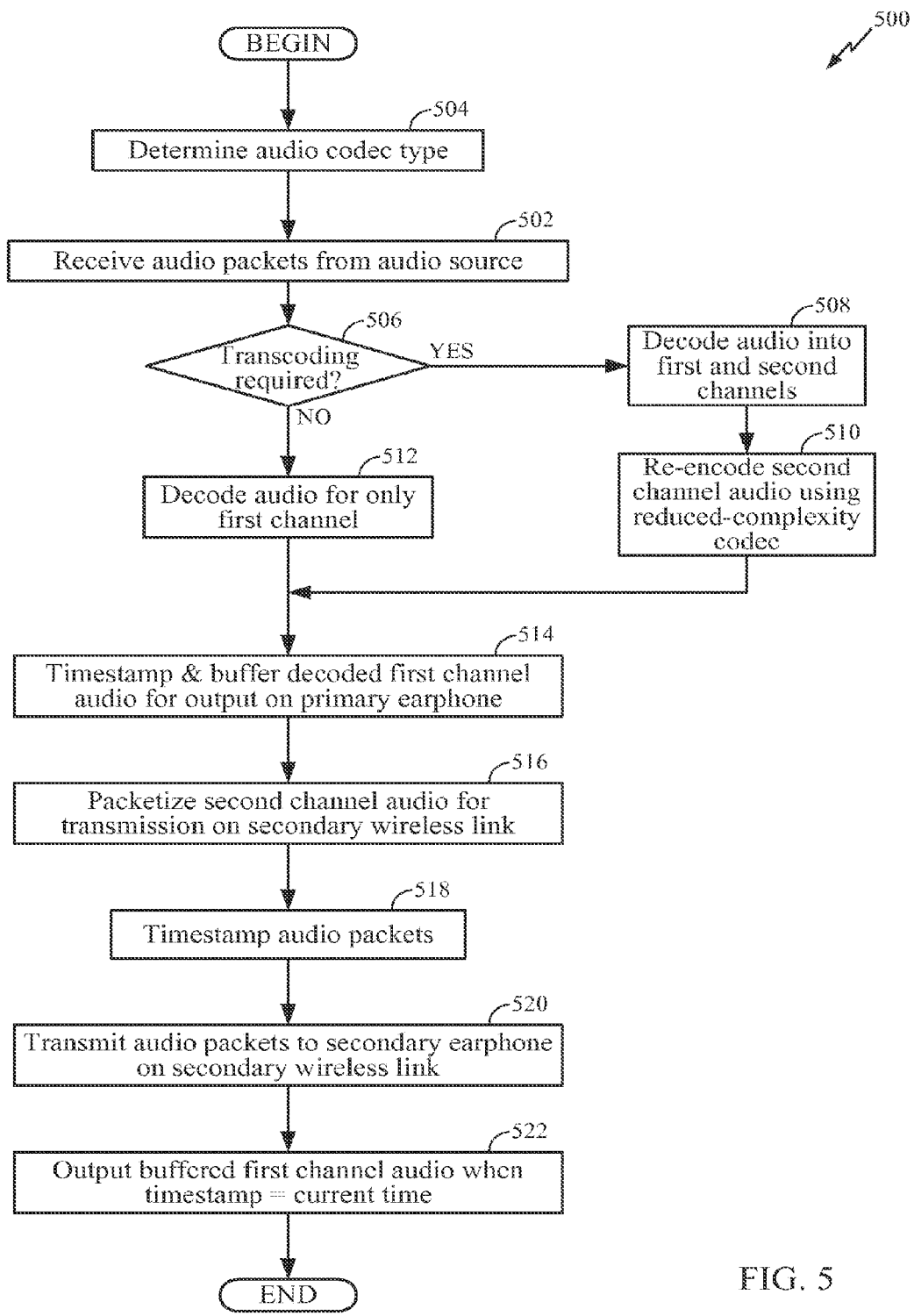
FIG. 5 is a flowchart illustrating a method of audio processing performed by primary earpiece of the wireless headset.
Figure 6:
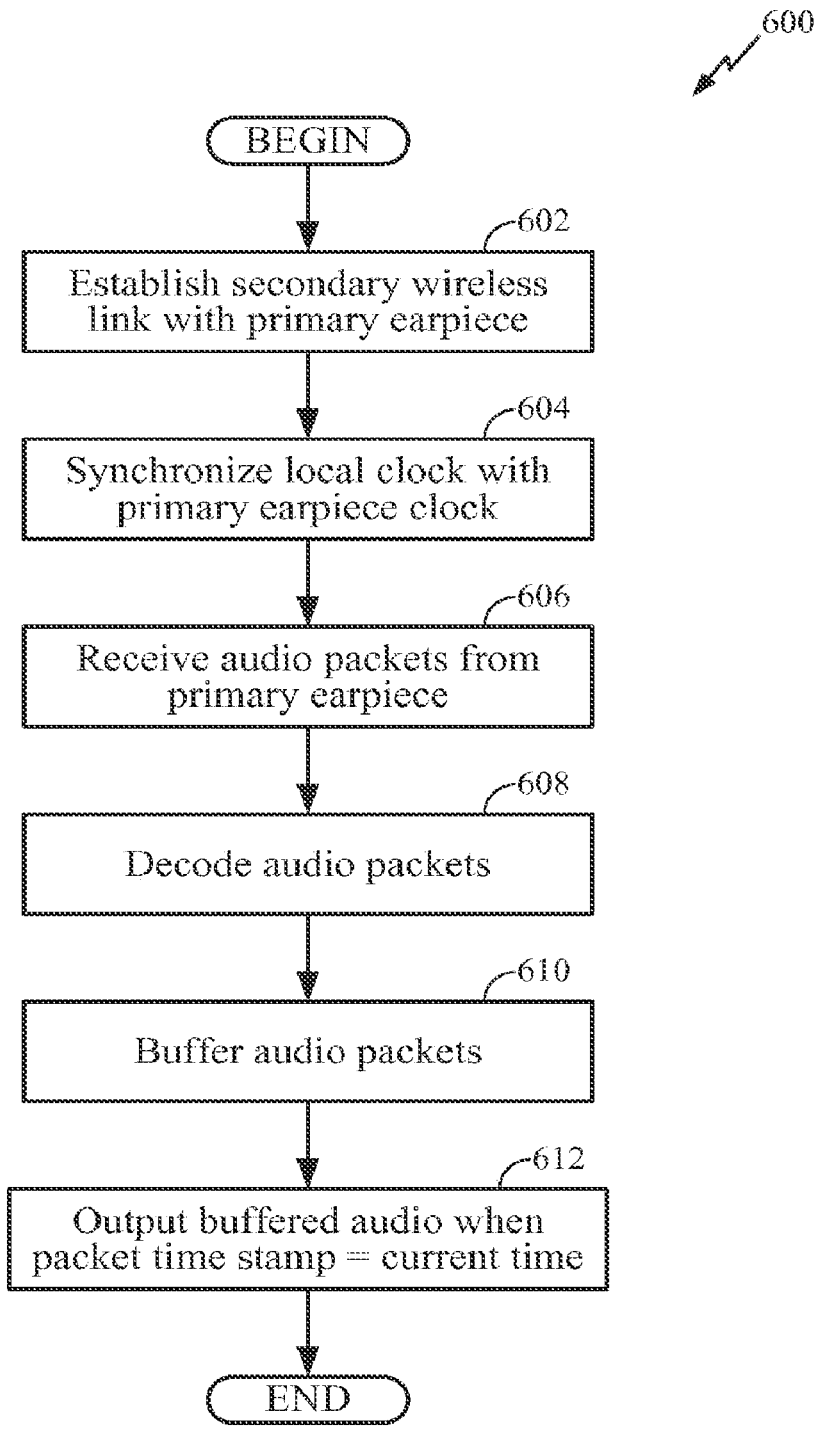
FIG. 6 is a flowchart illustrating a method of operating the secondary earpiece included in the wireless headset.

The audio processing function 406 involves the reception, transcoding (if necessary), re-transmission, and playback of audio received from the audio source 10. FIG. 5 describes a method of performing the audio processing function 406 of the primary earpiece 12. FIG. 6 describes audio processing carried out by the secondary earpiece 14.

FIG. 5 is a flowchart 500 illustrating a method of audio process performed by the primary earpiece 12 of the wireless headset 11. Generally, the method is performed under the control of the processor 54, coordinating operations of the various components of the primary earpiece 12.

In step 502, a Bluetooth streaming audio connection is established between the audio source 10 and the primary earpiece 12, as described in the A2DP specification. During this step, the audio codec type for incoming audio from the audio source 10 is determined. Using Bluetooth as the primary wireless link 20, the audio source 10 and the primary earpiece 12 can negotiate and determine the codec type using standard A2DP protocols and procedures.

In step 504, after the Bluetooth streaming audio connection is established, audio packets are transmitted from the audio source 10 over the primary wireless link 20 and received by the primary wireless interface 50 of the primary earpiece 12. Generally, the audio packets include digitized audio that is encoded using the negotiated codec. Each audio packet represents a predetermined duration of sound, e.g., 20 milliseconds, that is to be output at the headset 11. The audio packets can be formatted according to the A2DP profile, including one or more frames of encoded audio. The audio can be encoded using any suitable audio codec, including but not limited to SBC, MPEG-1 audio, MPEG-2 audio.

In decision step 506, the processor 54 determines whether the incoming audio should be transcoded prior to re-transmission on the secondary wireless link 22. Generally, if the codec type used on the primary wireless link 20 is relatively complex, e.g., MPEG-1, the incoming audio is transcoded from the relatively complex code to a simpler code using a reduced-complexity codec, such as a Bluetooth sub-band codec (SBC).

If the audio packets are to be transcoded, the incoming packets are first fully decoded into first and second audio channels (step 508). The second audio channel, which is destined for the secondary earpiece 14, is re-encoded using a reduced-complexity codec (step 510). The reduced-complexity codec can be implemented by software running on the processor 54.

If the audio packets are not transcoded, the audio packets are only partially decoded. Specifically, only the first audio channel is decoded for playback at the primary earpiece 12 (step 512). The second channel audio is not decoded and is simply re-packetized for transmission to the secondary earpiece 14 over the secondary wireless link 22.

In step 514, the decoded first audio channel is buffered in the audio output buffer 58 for subsequent output at the speaker 68 of the primary earpiece 12. Each packet of decoded first channel audio is time-stamped so that it can be output in synchronization with audio output at the secondary earpiece 14.

Figure 9:
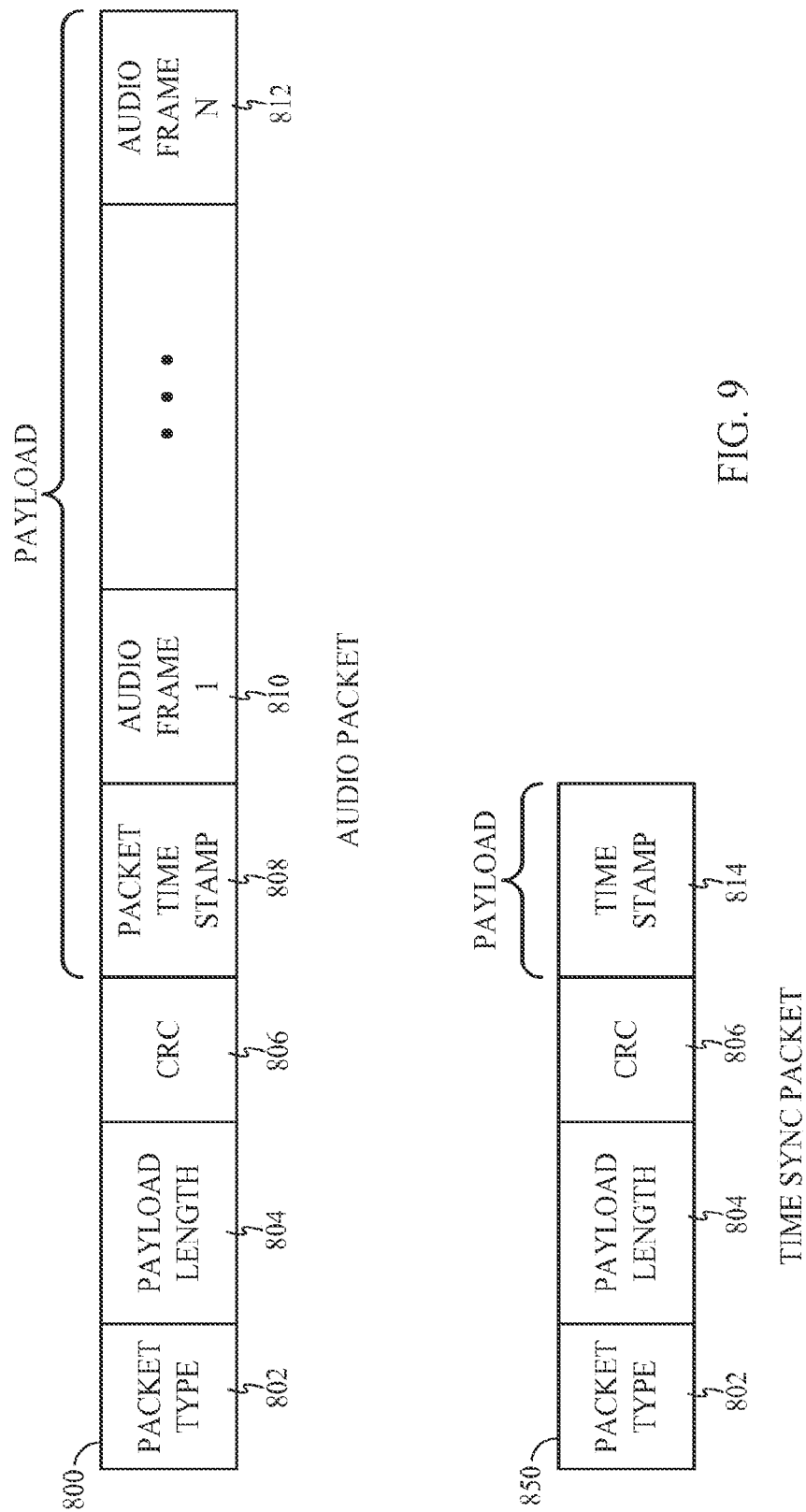
FIG. 9 illustrates exemplary formats for audio and time sync packets transmitted between the primary and secondary earpieces.

In step 516, the processor 54 packetizes the second audio channel into one or more audio packets for transmission to the secondary earpiece 14 by way of the secondary wireless link 22. FIG. 9 depicts an example format for the audio packets 800 transmitted on the secondary wireless link 22. The audio packets are preferably formatted for transmission over an NFC link, according to the NFC Interface and Protocol (NFCIP-1) specification, ISO/IEC 18092.

In step 518, a time stamp is included in each of the audio packets. The time stamps indicate the times at which the secondary earpiece 14 will output the audio contained in the packets. The time stamps are useful for synchronizing the audio output of the primary and secondary earpieces 12, 14.

In step 520, the primary earpiece 12 transmits the time-stamped audio packets over the secondary wireless link 22 to the secondary earpiece 14. The audio packets are preferably transmitted over an NFC link, according to the NFC Interface and Protocol (NFCIP-1) specification, ISO/TEC 18092.

In step 522, the decoded first channel audio stored in the audio output buffer 58 is output by the primary earpiece 12. Each packet of buffered first channel audio is output when the local clock in the primary earpiece 12 is equal to the audio packet's time stamp. This is achieved by the processor 54 comparing the packet time stamps to the local audio output clock. When a packet time stamp is equal to the local audio output clock, the processor 54 begins to transfer the digitized audio contained in the packet out of the audio output buffer 58 to the audio output circuitry 62, where it is rendered for output at the speaker 68.

FIG. 6 is a flowchart 600 illustrating a method of operating the secondary earpiece 14 of the wireless headset 11. Generally, the method is performed under the control of the processor 102, coordinating operations of the various components of the secondary earpiece 14.

In step 602, the secondary wireless link 22 is established with the primary earpiece 12. This step can be accomplished by the device discovery and link initiation protocols included in the NFC standard interfaces, which may be included in the secondary wireless interfaces 52, 100.

in step 604, the local audio output clock of the secondary earpiece 14 is synchronized with the primary earpiece 12 audio output clock. Details of this step are described herein below in connection with FIGS. 7-8.

In step 606, audio packets from the primary earpiece 12 are received at the secondary wireless interface 100. The audio packets are preferably transmitted over an NFC link and formatted according to the NFC Interface and Protocol (NFCIP-1) specification, ISO/IEC 18092. The audio packets are processed by the processor 102 to de-encapsulate and assemble their audio content for output at the speaker 110.

in step 608, the audio packets are decoded by the processor 102. The audio codec used by the primary and secondary earpieces 12, 14 for audio transmissions over the secondary wireless link 22 is preferably predetermined. The audio codec can be the SBC codec described in the A2DP standard.

In step 610, the decoded contents of the audio packets are buffered in the audio buffer 106.

In step 612, each buffered audio packet is output by the secondary earpiece 14 through its speaker 110 when the local audio output clock is equal to the audio packet time stamp. This is achieved by the processor 102 comparing the packet time stamps to the local audio output clock. When a packet time stamp is equal to the local audio output clock, the processor 102 begins to transfer the digitized audio contained in the packet out of the audio buffer 106 to the audio output circuitry 108, where it is rendered for output at the speaker 110.

Figure 7:
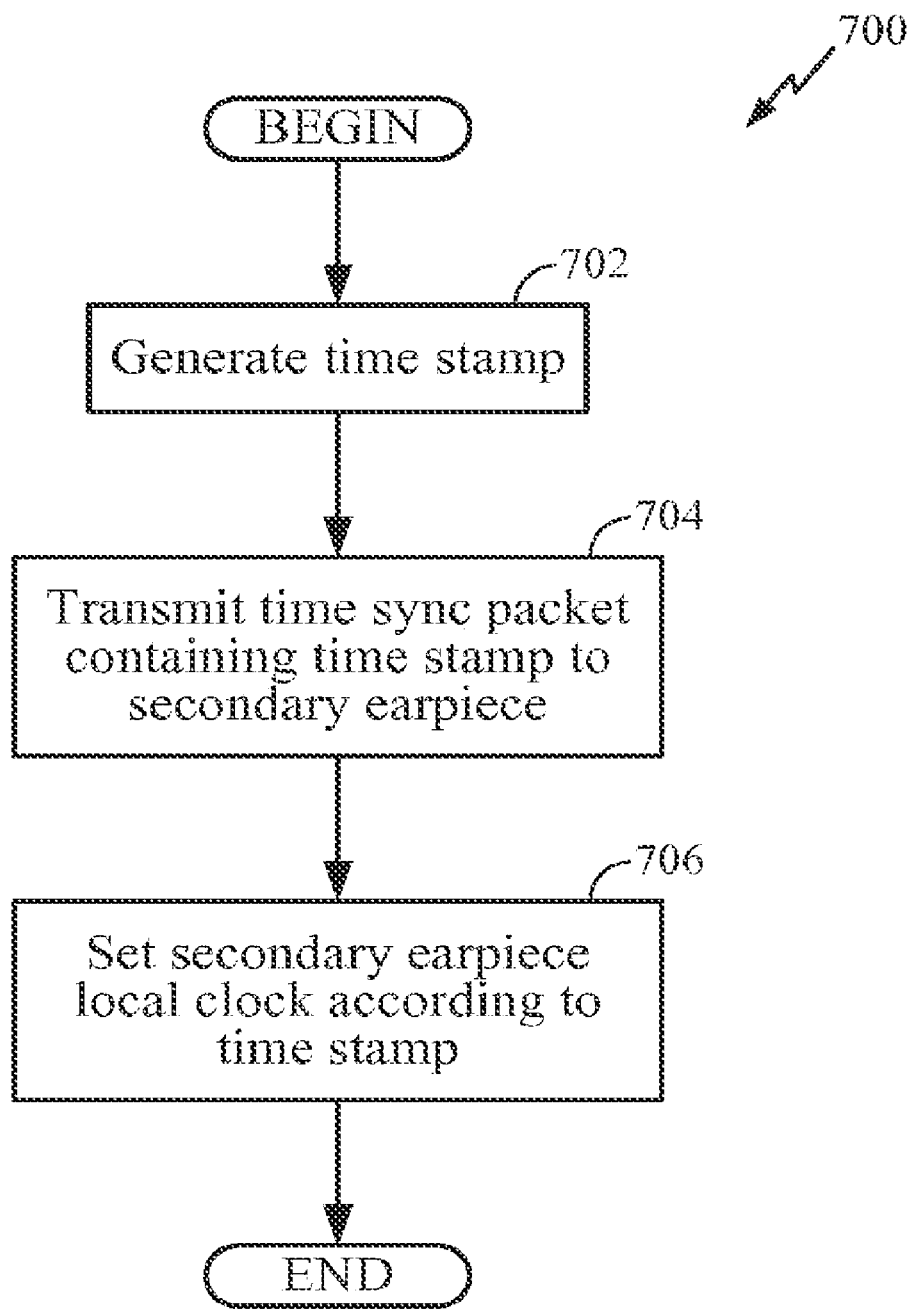
FIG. 7 is a flowchart illustrating a method of audio output clock synchronization between the primary and secondary earpieces.

FIG. 7 is a flowchart 700 illustrating a method of clock synchronization between the primary and secondary earpieces 12, 14. The method steps 702-706 are periodically repeated at predefined intervals to maintain the synchronicity of the audio output clocks in the primary and secondary earpieces 12, 14. In step 702, a time stamp is generated by the primary earpiece 14. The time stamp can represent the current time kept by the primary earpiece 14, plus any anticipated transmission processing delay caused by the primary earpiece processing and any anticipated transmission delay caused by the secondary wireless link 22.

In step 704, the time stamp in transmitted to the secondary earpiece 14 over the secondary wireless link 22 in a time sync packet 850. An exemplary format of the time sync packet 850 in shown in FIG. 9. Upon successfully receiving a time sync packet, the secondary earpiece 14 transmits a time sync handshake back to the primary earpiece over the secondary wireless link 22. The primary earpiece 12 may include an error correction routine that re-sends a new time sync packet prior to the next clock synchronization cycle if the handshake is not successfully received at the primary earpiece 12.

In step 706, the local audio output clock of the secondary earphone 14 is set according to the time stamp contained in the time sync packet 850. FIG. 5 conceptually illustrates a process of adjusting the local audio output clock within the secondary earpiece 14. The process can be implemented in software/firmware executed by the processor 102 of the secondary earpiece 14. A subtractor 754 determines the difference between the current time value 752 of the local audio output clock and the received time stamp 750. The output of the subtractor 754 represents an estimated error between the time stamp and the local audio output clock. A filter 758 is applied to the estimated error to compare the estimated error with a receiver processing delay 756. The receiver processing delay 756 generally represents the amount of time it takes the secondary earpiece 12 to process a time sync packet. The receiver processing delay 756 can be a predefined, constant value stored within the secondary earpiece memory 104, or it can be dynamically determined, for example, based on statistics of processing delays typically experienced by the secondary earpiece processor 102. If the estimated error and the receiver processing delay 756 are not equal, the filter 758 generates an adjustment factor to adjust the local audio output clock. The adjustment factor is typically the difference between the estimated error and the receiver processing delay 756.

FIG. 9 illustrates exemplary formats for audio and time synchronization (sync) packets transmitted between the primary and secondary earpieces 12, 14 over the secondary wireless link 22.

The audio packet 800 includes a packet type identifier 802, a payload length 804, a cyclic redundancy check (CRC) field 806, a packet time stamp 808, and one or more audio frames, e.g., audio frame 1 810 through audio frame N 812, where N is an integer greater than one. The payload of the audio packet includes the packet time stamp 808 and the audio frame 810, 812.

The packet type identifier 802 can be a single bit value that indicates whether the packet is an audio packet or a time sync packet. For example, if the packet type identifier 802 is set to '0', the packet is a time sync packet; and if the packet type identifier 802, is set to '1', the packet is an audio packet.

The payload length 804 can be a fifteen-bit value that indicates that byte count of the packet payload.

The CRC field 806 can contain a sixteen-bit CRC value computed over the other fields of the packet. Techniques of CRC error detection are well known, and the CRC value can be computed using any suitable CRC algorithm. Other types of error detection and/or correction may be employed instead of CRC, including checksums or the like.

The packet time stamp 808 contains the time stamp generated by the primary earpiece 12. The packet time stamp 808 indicates the time at which the audio contained in the audio packet 800 will begin output at the secondary earpiece 14. The packet time stamp may be a 32-bit value.

The audio frames 810, 812 can be Bluetooth SBC audio frames.

The time sync packet 850 includes the packet type identifier 802, the payload length 804, the CRC field 806 and a time stamp 814. The payload of the time sync packet in the time stamp. The time stamp can be a 32-bit value indicating the current time at the primary earpiece 14. The time stamp is used to adjust the local audio output clock of the secondary earpiece, as described above in connection with FIGS. 7 and 8.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Certain embodiments have been described. However, various modifications to these embodiments are possible, and the principles presented herein may be applied to other embodiments as well. Methods and/or components as described herein may be implemented in hardware, software, firmware or any suitable combination of the foregoing. The various components and/or method steps may be implemented in a software program having sets of instructions (e.g., code segments) executable by one or more digital circuits, such as microprocessors, DSPs, embedded controllers, or intellectual property (IP) cores included in the headset 11 or audio source 10.

Other embodiments and modifications will occur readily to those of ordinary skill in the art in view of these teachings. Therefore, the following claims are intended to cover all such embodiments and modifications when viewed in conjunction with the above specification and accompanying drawings.

The invention claimed is:

1. A method of outputting audio at a speaker, comprising:
receiving audio at a first speaker;
determining a codec type corresponding to the received audio;
determining, based on the codec type, whether to transcode the received audio;
transcoding the received audio if the codec type is in a predetermined class of codecs;
transmitting the transcoded audio from the first speaker to a second speaker over a wireless link; and outputting the audio at the first and second speaker.

2. The method of claim 1, further comprising:
if the codec type is not in the predetermined class of codecs, decoding the received audio for only a first channel;
buffering the first channel audio for output at the first speaker; and
packetizing a second channel of received, undecoded audio for transmission to the second speaker over the wireless link.

3. The method of claim 2, wherein transcoding includes:
decoding the received audio into first and second channels; and
encoding the second channel audio using a reduced-complexity codec.

4. The method of claim 3, further comprising:
time stamping the first channel audio and second channel audio;
buffering the first channel audio for output at the first speaker; and
packetizing the second channel audio for transmission to the second speaker over the wireless link.

5. The method of claim 1, further comprising:
the first speaker detecting the second speaker; and
upon detection of the second speaker, establishing the wireless link between the first and second speakers.

6. The method of claim 5, further comprising:
synchronizing local clocks within the first and second speakers.

7. The method of claim 1, further comprising:
generating a time stamp at the first speaker;
transmitting the time stamp to the second speaker over the wireless link;
setting a local clock in the second speaker based on the time stamp; and
outputting the audio at the second speaker based on the local clock.

8. The method of claim 1, further comprising:
the second speaker decoding audio received over the wireless link.

9. The system of claim 1, further comprising:
means, included in the second speaker, for decoding audio received over the wireless link.

10. A system for outputting audio at a speaker, comprising:
means for receiving audio at a first speaker;
means for determining a codec type corresponding to the received audio;
means for determining, based on the codec type, whether to transcode the received audio;
means for transcoding the received audio if the codec type is in a predetermined class of codecs;
means for transmitting the transcoded audio from the first speaker to a second speaker over a wireless link; and
means for outputting the audio at the first and second speakers.

11. The system of claim 10, further comprising:
means for decoding the received audio for only a first channel, if the codec type is not in the predetermined class of codecs;
means for buffering the first channel audio for output at the first speaker; and
means for packetizing a second channel of received, undecoded audio for transmission to the second speaker over the wireless link.

12. The system of claim 10, wherein the transcoding means includes:
means for decoding the received audio into first and second channels; and
means for encoding the second channel audio using a reduced-complexity codec.

13. The system of claim 12, further comprising:
means for time stamping the first channel audio and second channel audio;
means for buffering the first channel audio for output at the first speaker; and
means for packetizing the second channel audio for transmission to the second speaker over the wireless link.

14. The system of claim 12, further comprising:
means, included in the first earpiece, for detecting the second speaker; and
means for establishing the wireless link between the first and second speakers, upon detection of the second speaker.

15. The system of claim 10, further comprising:
means for synchronizing local clocks within the first and second speakers.

16. The system of claim 15, further comprising:
means for generating a time stamp at the first speaker;
means for transmitting the time stamp to the second speaker over the wireless link;
means for setting a local clock in the second speaker based on the time stamp; and means for outputting the audio at the second speaker based on the local clock.

17. A computer-readable medium embodying a set of instructions, wherein the set of instructions when executed by one or more processors comprises:
- a code segment for receiving audio at a first speaker;
- a code segment for determining a codec type corresponding to the received audio;
- a code segment for determining, based on the codec type, whether to transcode the received audio;
- a code segment for transcoding the received audio if the codec type is in a predetermined class of codecs;
- a code segment for transmitting the transcoded audio from the first speaker to a second speaker over a wireless link; and
- a code segment for outputting the audio at the first speaker.

18. The computer-readable medium of claim 17, further comprising:
- a code segment for decoding the received audio for only a first channel, if the codec type is not in the predetermined class of codecs;
- a code segment for buffering the first channel audio for output at the first speaker; and
- a code segment for packetizing a second channel of received, undecoded audio for transmission to the second speaker over the wireless link.

19. The computer-readable medium of claim 18, wherein the transcoding code segment includes:
- a code segment for decoding the received audio into first and second channels; and
- a code segment for encoding the second channel audio using a reduced-complexity codec.

20. The computer-readable medium of claim 18, further comprising:
- a code segment for time stamping the first channel audio and second channel audio;
- a code segment for buffering the first channel audio for output at the first speaker; and
- a code segment for packetizing the second channel audio for transmission to the second speaker over the wireless link.

21. The computer-readable medium of claim 18, further comprising:
- a code segment, executable by the first speaker, for detecting the second speaker; and
- a code segment for establishing the wireless link between the first and second speakers, upon detection of the second speaker.

22. The computer-readable medium of claim 18, further comprising:
- a code segment for synchronizing local clocks within the first and second speakers.

23. The computer-readable medium of claim 18, further comprising:
- a code segment for generating a time stamp at the first speaker;
- a code segment for transmitting the time stamp to the second speaker over the wireless link;
- a code segment for setting a local clock in the second speaker based on the time stamp; and
- a code segment for outputting the audio at the second speaker based on the local clock.

24. The computer-readable medium of claim 18, further comprising:
- a code segment, executable by the second speaker, for decoding audio received over the wireless link.

25. A wireless system comprising:
- a first speaker; and
- a second speaker;
- wherein the first and second speakers are configured to communicate with each other over a wireless link, and
- wherein the first speaker comprises a processor configured to transcode digitized audio prior to the digitized audio being transmitted to the second speaker.

26. The wireless system of claim 25, wherein the first speaker comprises a first wireless interface configured to communicate with an audio source over a first wireless link.

27. The wireless system of claim 26, wherein the first speaker comprises a second wireless interface configured to communicate with the second speaker over the wireless link; and wherein the second speaker comprises a wireless interface configured to communicate with the first speaker over the wireless link.

28. The wireless system of claim 25, wherein the first speaker is configured to transmit one or more audio packets to the second speaker over the wireless link.

29. The wireless system of claim 25, wherein the processor is configured to decode audio received by the first speaker and encode at least a portion of the decoded audio using a reduced-complexity codec.

30. The wireless system of claim 29, wherein each of the audio packets comprises a time stamp for synchronizing audio output of the first and second speakers.

31. The wireless system of claim 25, further comprising:
- means for synchronizing audio output of the first and second speakers.

32. The wireless system of claim 25, wherein the first speaker transmits one or more time synchronization packets to the second speaker over the wireless link.

33. The wireless system of claim 25, wherein the wireless link is a near field communication (NFC) wireless link.

34. The wireless system of claim 25, wherein the first speaker includes an audio buffer configured to buffer audio for output at the first speaker.

35. The wireless system of claim 25, wherein the second speaker includes an audio buffer configured to buffer audio for output at the second speaker.

36. A speaker, comprising:
- a first wireless interface configured to communicate with an audio source over a first wireless link, and
- a second wireless interface configured to communicate with a second speaker over a second wireless link;
- a processor configured to transcode first encoded audio received from the audio source into second encoded audio; and
- means for transmitting the second encoded audio through the second wireless interface.

37. The speaker of claim 36, wherein the first wireless interface is selected from the group consisting of a Bluetooth interface and a Wi-Fi interface.

38. The speaker of claim 36, wherein the second wireless interface is a near field communication (NFC) interface.

39. The speaker of claim 36, where the processor further is configured to receive audio from the first wireless interface, process the audio, and transfer at least a portion of the processed audio to the second wireless interface for transmission to the second speaker over the second wireless link.

* * * * *